(12) United States Patent
Kamikubo et al.

(10) Patent No.: US 6,906,824 B1
(45) Date of Patent: Jun. 14, 2005

(54) TANDEM TYPE PRINTER SCANNING OPTICAL SYSTEM HAVING DIFFRACTION LENS STRUCTURE

(75) Inventors: Junji Kamikubo, Tokyo (JP); Daisuke Koreeda, Tokyo (JP)

(73) Assignee: PENTAX Corporation, Tokyo (JP)

( * ) Notice: Subject to any disclaimer, the term of this patent is extended or adjusted under 35 U.S.C. 154(b) by 770 days.

(21) Appl. No.: 09/652,008

(22) Filed: Aug. 31, 2000

(30) Foreign Application Priority Data

Sep. 2, 1999 (JP) ............................................ 11-248465

(51) Int. Cl.$^7$ ........................ G06K 15/00; G02B 26/00; G02B 27/00
(52) U.S. Cl. ........................ 358/1.7; 359/196; 359/206
(58) Field of Search ........................ 359/196, 204–208; 358/1.7, 505–514

(56) References Cited

U.S. PATENT DOCUMENTS

| | | | | |
|---|---|---|---|---|
| 5,181,137 A | * | 1/1993 | Koide | 359/217 |
| 5,838,480 A | | 11/1998 | McIntyre et al. | |
| 5,870,659 A | | 2/1999 | Maruyama et al. | |
| 6,028,688 A | * | 2/2000 | Iizuka | 359/205 |
| 6,084,696 A | | 7/2000 | Hama | |
| 6,115,164 A | | 9/2000 | Kamikubo | |
| 6,124,962 A | * | 9/2000 | Kamikubo | 359/205 |

* cited by examiner

*Primary Examiner*—King Y. Poon
(74) *Attorney, Agent, or Firm*—Greenblum & Bernstein, P.L.C.

(57) ABSTRACT

A tandem type printer is provided with a plurality of scanning optical systems, a plurality of fθ lenses and photoconductive drums, which correspond to the scanning optical systems, respectively. Each scanning optical system includes a laser source and a deflector that deflects the laser beam emitted by the laser source to scan, in a main scanning direction, within a predetermined angular range. The deflected laser beam is converged by the fθ lens on the corresponding photoconductive drum and form an image. Images formed on the plurality of photoconductive drums are developed and transferred on a sheet in an overlaid fashion. Each fθ lens includes a glass lens that is burdened with substantially all the power, in the main scanning direction, of the fθ lens, and a plastic lens that is burdened with compensation for aberrations of the fθ lens. Further, a diffraction lens structure is formed to compensate for a lateral chromatic aberration of the fθ lens in the main scanning direction. Each fθ lens satisfies conditions:

$0.0 < fa/fd < 0.20$; and $0.75 < fa/fg < 1.20$, where, fa, fd and fg represent focal lengths of the fθ lens, diffraction lens structure, and glass lens, in the main scanning direction, respectively.

4 Claims, 7 Drawing Sheets

TANDEM TYPE PRINTER SCANNING OPTICAL SYSTEM HAVING DIFFRACTION LENS STRUCTURE

BACKGROUND OF THE INVENTION

The present invention relates to a scanning optical system employed, for example, in a tandem type color laser beam printer.

Conventionally, a scanning optical system, which is employed, for example, in a tandem type color laser beam printer is known. Such a color laser beam printer includes a plurality of scanning optical systems and photoconductive drums corresponding to a plurality of color components of a color image formed by the color laser beam printer. In each scanning optical system, a laser diode, a polygonal mirror and an fθ lens are provided. The laser beam emitted by the laser diode is deflected by the polygonal mirror. The deflected laser beam is converged by the fθ lens and forms a beam spot on a surface to be scanned. Since the polygonal mirror is rotated, the deflected beam scans within a predetermined angular range. Thus, the beam spot formed on the surface to be scanned moves along a predetermined scanning line, extending direction of which will be referred to as a main scanning direction. The surface to be scanned is a circumferential surface of a photoconductive drum. By using the plurality of scanning optical systems and the corresponding photoconductive drums for a plurality of color components, respectively, a plurality of color image components are printed, in an overlaid fashion, on the same sheet so that a color image is formed.

In such a tandem type color printer, i.e., a printer employing a plurality of scanning optical systems and photoconductive drums, in order to avoid color drift of an image, writing start position and writing end position of each scanning line of each color component should be adjusted accurately.

However, if the fθ lens of each scanning optical system has lateral chromatic aberration, and wavelength of a laser beam emitted by each laser diode has individual errors, then the writing start and/or end positions of the scan line may be different among the color components. In such a case, the color drift appear on a printed image and the quality of the formed image is deteriorated.

SUMMARY OF THE INVENTION

It is therefore an object of the present invention to provide an improved tandem type scanning optical system which is capable of preventing the color drift due to variation of wavelengths among the laser beams emitted by a plurality of light sources, and due to uneven distribution of refractive index caused by uneven temperature distribution inside the printer.

For the above object, according to the present invention, there is provided a tandem type printer that includes a plurality of scanning optical systems respectively having plurality of fθ lenses, and photoconductive drums, which correspond to the scanning optical systems, respectively. Each scanning optical system includes a laser source and a deflector that deflects the laser beam emitted by the laser source to scan, in a main scanning direction, within a predetermined angular range. The deflected laser beam is converged by the fθ lens on the corresponding photoconductive drum and form an image. Images formed on the plurality of photoconductive drums are developed and transferred on a sheet in an overlaid fashion. Each fθ lens includes a glass lens that is burdened with substantially all the power, in the main scanning direction, of the fθ lens, and a plastic lens that is burdened with compensation for aberrations of the fθ lens. Further, a diffraction lens structure is formed to compensate for a lateral chromatic aberration of the fθ lens in the main scanning direction. Each fθ lens satisfies conditions:

$$0.0 < fa/fd < 0.20; \text{ and}$$

$$0.75 < fa/fg < 1.20,$$

where, fa, fd and fg represent focal lengths of the fθ lens, diffraction lens structure, and glass lens, in the main scanning direction, respectively.

With this configuration, the lateral chromatic aberration is compensated by the diffraction lens structure. Further, since the glass lens is mainly burdened with the power in the main scanning direction, and change of refractive index due to variation of temperature affects little. Therefore, with a printer employing the scanning optical system according to the present invention, color drift of printed images due to variation of wavelengths of the laser beams for respective color components, and due to uneven distribution of temperature inside the printer can be suppressed, and color images can be printed accurately.

Optionally, the diffraction lens structure may be formed on a refraction surface of said plastic lens in each fθ lens.

BRIEF DESCRIPTION OF THE ACCOMPANYING DRAWINGS

DETAILED DESCRIPTION OF THE EMBODIMENTS

Hereinafter, the embodiments according to the invention will be described in detail with reference to the accompanying drawings.

Figure 1:
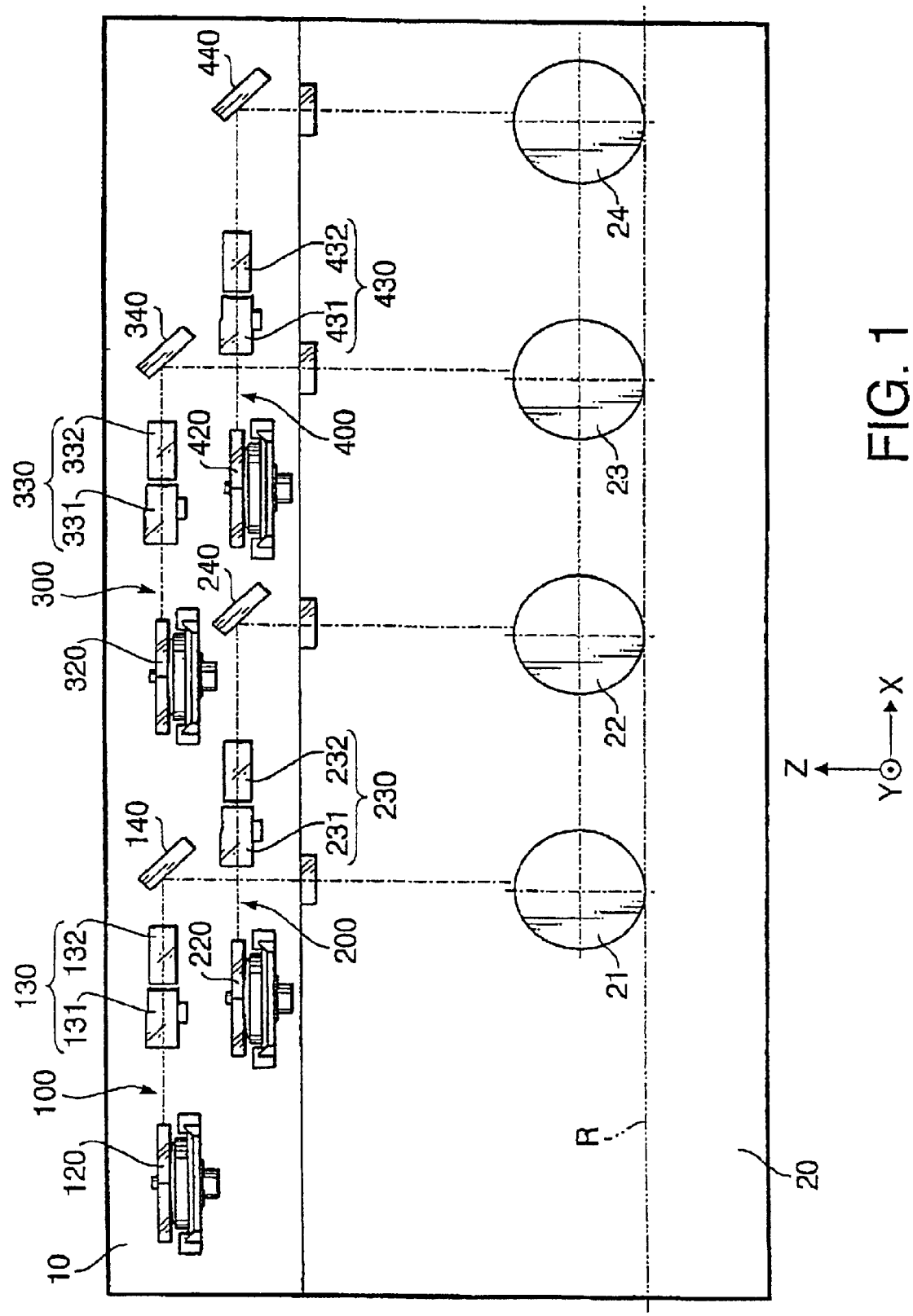
FIG. 1 is a side view of a tandem type printer illustrating an arrangement of optical elements therein.

FIG. 1 is a side view of a printer to which embodiments according to the present invention can be applied. The printer shown in FIG. 1 is configured such that a color image is formed by printing black, cyan, yellow and magenta images on a sheet in an overlaid fashion. For this purpose, the printer includes a plurality of scanning optical systems and photoconductive drums for the black, cyan, yellow and magenta components, respectively.

The printer shown in FIG. 1 has a housing 10 and a drum support 20. The housing 10 accommodates first through fourth scanning optical systems 100, 200, 300 and 400. The drum support 20 rotationally supports first through fourth photoconductive drums 21, 22, 23 and 24, which are exposed to scanning beams emitted from the first through fourth scanning optical system 100–400, respectively. The first through fourth photoconductive drums 21–24 are arranged such that rotation axes thereof are parallel to each other. Units (e.g., a developing unit, a transfer unit, a cleaning unit) for performing an electronic image forming process are provided around each of the photoconductive drums 21–24. Since such units are well-known, they are not shown in the drawing and description thereof is omitted for the sake of simplicity.

In the printer, a recording sheet is fed from a left-hand side to a right-hand side of FIG. 1 along a sheet feed path R. Then, toner images of respective color components (i.e., black, cyan, yellow and magenta components) are transferred from the first to fourth photoconductive drums 21–24 sequentially, thereby a color image being finally formed on the recording sheet. The color image thus transferred on the recording sheet is fixed thereon by a fixing unit. The fixing process is also well-known in the field of electrophotographic process, and therefore, it is not shown in FIG. 1 and a detailed description will not be given.

Next, a configuration of the first scanning optical system 100 will be described in detail with reference to FIG. 1 and FIG. 2, which is a plan view showing an arrangement of optical elements of the first scanning optical system 100. It should be noted that all the scanning optical systems 100–400 are structurally the same, and therefore what is described in connection with the first scanning optical system 100 also applies to the other scanning optical systems 200–400.

Figure 2:
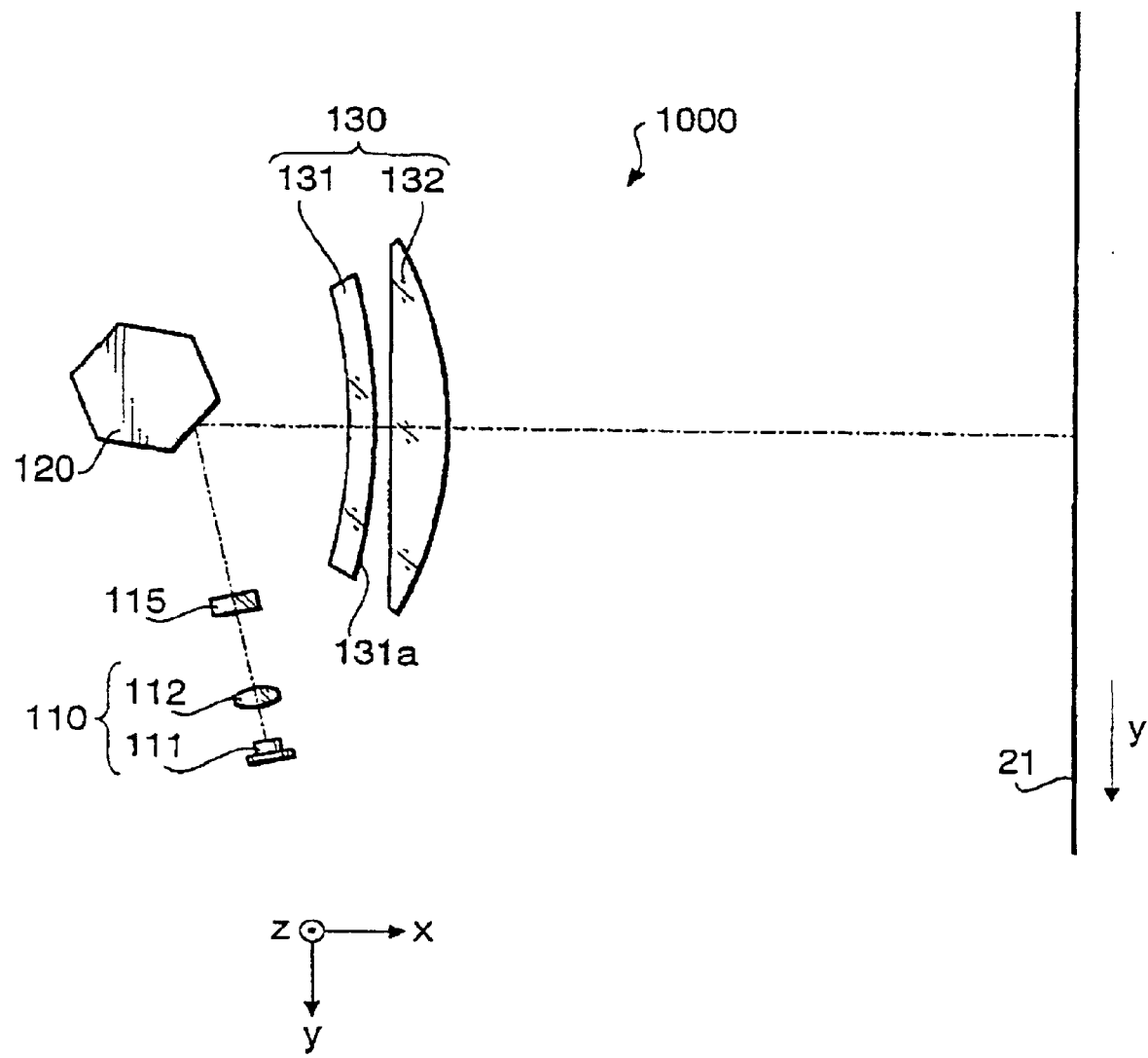
FIG. 2 is a plan view of the scanning optical system according to a first embodiment.

As shown in FIGS. 1 and 2, the first scanning optical system 100 is provided with:

a laser source unit 110 for emitting a collimated laser beam;

a polygonal mirror 120 for deflecting the collimated laser beam to scan, in a main scanning direction, within a predetermined angular range; and an fθ lens 130 for converging the scanning laser beam on the circumferential surface of the photoconductive drum 21 to form a scanning line thereon. Strictly speaking, the laser beam passed through the fθ lens 130 is reflected by a mirror 140 (see FIG. 1), and then converged on the surface of the photoconductive drum 21. However, since the mirror 140 functions only to bend an optical path, FIG. 2 is drawn as a developed view, omitting the mirror 140 therefrom. In FIG. 1, a rectangular coordinate system indicated by upper cases XYZ is shown. In FIG. 2, another rectangular coordinate system indicated by lower cases xyz is shown. In FIG. 1, the main scanning direction is defined as Y-axis direction, and an auxiliary scanning direction, which is perpendicular to the main scanning direction on the surface of the photoconductive drum 21, is defined as X-axis direction. In FIG. 2, the main scanning direction is defined as the y-axis direction, and the auxiliary scanning direction is defined as the z-axis direction.

As shown in FIG. 2, the laser source unit 110 includes a laser diode 111, and a collimating lens 112 for collimating the laser beam emitted by the laser diode 111. A cylindrical lens 115, which has positive power in the auxiliary scanning direction, is provided between the laser source unit 110 and the polygonal mirror 120. It should be noted that, in FIG. 1, the auxiliary direction at the photoconductive drum 21 is the X-axis direction. However, the auxiliary direction at the cylindrical lens 115 is the Z-axis direction since the laser beam is reflected by the mirror 140. In FIG. 2, since the mirror 140 is omitted from the drawing, the auxiliary direction is referred to as the z-axis direction both at the photoconductive drum 21 and at the cylindrical lens 115.

The fθ lens 130 includes a first lens 131 and a second lens 132. Further, on a photoconductive drum side surface of the first lens, a Fresnel lens like diffraction lens structure 131a is formed. The first lens 131 is a plastic lens and burdened with (functions to) compensation for aberrations (e.g., curvature of field in the main scanning direction and errors of fθ characteristics). The second lens 132 is a glass lens and provides almost all the power, in the main scanning direction, of the fθ lens 130. The diffraction lens structure 131a is formed as a part of a pattern rotationally symmetrical about an optical axis of the fθ lens 130 and has a plurality of annular zones. The diffraction lens structure 131a functions to compensate for lateral chromatic aberration, in the main scanning direction, of the refractive lens structure of the fθ lens 130.

The laser beam deflected by the polygonal mirror 120, and passed through the first and second lenses 131 and 132 of the fθ lens 130 is, as shown in FIG. 1, reflected by a mirror 140 downward and incident on the first photoconductive drum 21. The polygonal mirror 120 rotates clockwise, in FIG. 2, and the deflected beam scans on the circumferential surface of the photoconductive drum in the main scanning direction, i.e., in the y-axis direction in FIG. 2.

The collimated laser beam emitted by the laser source 110 is converged, only in the auxiliary scanning direction, on a plane closely adjacent to the reflection surface of the polygonal mirror 120. Then, the beam: is deflected by the polygonal mirror 120, and is converged, by the fθ lens 130, on the photoconductive drum 21. With this configuration, facet error of the reflection surfaces of the polygonal mirror 120 can be compensated, and therefore, shift of the scanning line, in the auxiliary scanning direction, on the photoconductive drum 21 due to the facet error can be prevented.

As aforementioned, the second through fourth scanning optical systems 200–400 are configured similarly to the first scanning optical system 100. That is, the second scanning system 200 includes a laser source (not shown), a polygonal mirror 220 and an fθ lens 230 including first and second lenses 231, 232, and a mirror 240. The second scanning system 200 forms a scanning line on the circumferential surface of the second photoconductive drum 22. The third scanning system 300 includes a laser source (not shown), a polygonal mirror 320 and an fθ lens 330 including first and second lenses 331, 332, and a mirror 340. The third scanning system 300 forms a scanning line on the circumferential surface of the third photoconductive drum 23. The fourth scanning system 400 includes a laser source (not shown), a polygonal mirror 420 and an fθ lens 430 including first and second lenses 431, 432, and a mirror 440. The fourth scanning system 400 forms a scanning line on the circumferential surface of the third photoconductive drum 24.

Next, the structure of the fθ lens 130 will be described, and then numerical examples of the fθ lens 130 will be explained as three embodiments.

As aforementioned, the fθ lens 130 includes the first and second refractive lenses 131 and 132, and the diffraction lens structure 131a.

It is well-known that the diffraction lens structure has a dispersion, an absolute value of which is relatively large and sign of which is negative. Therefore, by combining the diffractive lens structure, having relatively small power, with the refractive lens, the lateral chromatic aberration can be compensated.

In order to reduce the lateral chromatic aberration and variation of the power due to a change of refractive index caused by a change in temperature, according to the embodiment, a glass lens is included in the fθ lens 130. The glass lens provides almost all the power in the main scanning direction.

Specifically, as aforementioned, the fθ lens 130 is constructed to have the plastic lens (first lens) 131 which has almost no power in the main scanning direction and the glass lens (the second lens) 132 which provides almost all the power, in the main scanning direction, of the fθ lens 130. Since the glass lens 132 provides almost all the power of the fθ lens 130 in the main scanning direction, a change of power, due to a change of temperature, of the glass lens is very small, variation of power of the fθ lens 130 is well prevented. Further, by the diffraction lens structure 131*a*, in association with the refractive lenses 131 and 132, the lateral chromatic aberration can be compensated.

More specifically, the second long 132 and the diffractive lens structure 131*a* are designed to satisfy conditions (1) and (2) below:

$$0.0 < fa/fd < 0.20 \quad (1)$$

$$0.75 < fa/fg < 1.20 \quad (2)$$

where, fa represents a focal length, in the main scanning direction, of the fθ lens 130;

fd represents a focal length, in the main scanning direction, of the diffraction lens structure 131*a*; and fg represents a focal length, in the main scanning direction, of the second (glass) lens 132.

Conditions (1) and (2) define, in other words, the upper and lower limits of the power of the glass lens 132 and the diffraction lens structure 131*a* normalized by the power of the fθ lens 130.

In condition (1), if fa/fd is negative (i.e., smaller than 0.0), the lateral chromatic aberration of the diffractive lens structure 131*a* and that of the refractive lens structure are directed in the same direction, and therefore, the lateral chromatic aberration cannot be compensated by combining the diffractive lens structure 131*a* with the refractive lens structure. If fa/fd is greater than 0.20, the power of the diffraction lens structure 131*a* is too large, and the lateral chromatic aberration is overcorrected.

In condition (2), if fa/fg is smaller than 0.75, the power of the glass lens 132 is too small, and a positive power burdened by the plastic lens 131 is too large. If fa/fg exceeds 1.20, the power of the glass lens 132 is too large, and the amount of negative power provided by the plastic lens 131 is too large. In either case, the absolute value of the power provided by the plastic lens 131 is too large, which results in a relatively large change due to a change in temperature. Thus, if condition (2) is not satisfied, it is impossible to reduce both the lateral chromatic aberration and the change in power of the fθ lens 130 due to the change of the temperature.

It should be noted that, in general, a diffraction lens structure can be expressed by a sag amount SAG(h) representing a distance between a plane, which is tangent to the diffraction lens structure at a point where the optical axis intersects with the diffraction lens structure, and a point on the diffraction lens structure at height (a distance from the optical axis) h. The sag amount SAG(h) is obtained by the following formula (3).

$$SAG(h) = X(h) + S(h) \quad (3)$$

where, X(h) represents a base curve of the surface on which the diffraction lens structure is formed. The base curve X(h) is expressed by the following formula (4).

$$X(h) = \left\{ \frac{ch^2}{1 + \sqrt{1-(\kappa+1) \cdot c^2 h^2}} \right\} + A4h^4 + A6h^6 + A8h^8 + A10h^{10} \quad (4)$$

where, c=1/r, r represents radius of curvature on the optical axis, κ represents a conical coefficient, A4, A6, A8 and A10 represent fourth, sixth, eighth, and tenth aspherical coefficients.

An additional optical path length Δφ(h) to be added by the diffraction lens structure is obtained by the following formula (5).

$$\Delta\phi(h) = P2h^2 + P4h^4 + P6h^6 + P8h^8 + P10h^{10} \quad (5)$$

where, Pn represents an n-th (n being an even number) order coefficient of an optical path difference function. The term S(h) in formula (3) is calculated in accordance with the following formula (6).

$$S(h) = \frac{\{|MOD(\Delta\phi(h)+C,-1)|-C\} \cdot \lambda}{n-1+Dh^2} \quad (6)$$

where, C is a constant for setting a phase of boundaries of the annular zones, and can be any desired value between 0 and 1 (C=0.5 in the following examples), and D represents a coefficient to compensate for variation of additional phase which is caused as the light beam impinges on the diffraction lens structure obliquely, λ represents a wavelength of the light beam.

As is known. MOD is a modulo function and MOD(a,b) is defined as:

$$MOD(a,b) = a - b \cdot INT(a/b).$$

A zone number corresponding to each zone is expressed by the formula (7).

$$N = INT(|\Delta\phi(h)+C|) \quad (7)$$

where, N=0 corresponds to a zone intersecting with the optical axis.

First Embodiment

FIG. 2 is a plan view of the scanning optical system 1000, showing an arrangement of optical elements, according to a first embodiment of the invention. In TABLE I, numerical structure of the optical elements, on the photoconductive drum side thereof with respect to the cylindrical lens is indicated. In TABLE I, fa denotes a focal length of the fθ lens 130 in the main scanning direction, ry denotes a radius of curvature in the main scanning direction (i.e. y-axis direction in FIG. 2), rz denotes a radius of curvature (which is omitted for a rotationally symmetrical surface) in the auxiliary scanning direction (i.e., z-axis direction in FIG. 2), d denotes a distance between adjacent surfaces on the optical axis, and n denotes a refractive index at wavelength of 780 nm.

In TABLE I, surface #1 and #2 are the surfaces of the cylindrical lens 115, surface #3 is a mirror surface of the polygonal mirror 120, surfaces #4 and #5 are the surfaces of the first lens 131, and surfaces #6 and #7 are those of the second lens 132.

TABLE I

| | fa = 199.9 mm | scan width: 320 mm | design λ: 780 nm | |
|---|---|---|---|---|
| No. | ry | rz | d | n |
| #1 | inf. | −50.0 | 4.00 | 1.51072 |
| #2 | inf. | — | 94.50 | |
| #3 | inf. | — | 67.00 | |
| #4 | −378.99 | −30.95 | 8.00 | 1.48617 |
| #5 | −491.66 | — | 5.00 | |
| #6 | inf. | 18.00 | | 1.76591 |
| #7 | −154.30 | −30.13 | 201.25 | |

Surface #4 is an aspherical surface, which does not have an axis of symmetry. A radius of curvature of a cross section of surface #4 taken along a plane parallel to an x-z plane spaced from the optical axis is set independently from the cross section taken along an x-y plane. Hereinafter, such a surface will be referred to as a progressive toric aspherical surface, which is expressed by the following formula (8).

$$x(y) = \frac{cy^2}{1 + \sqrt{1 - (\kappa + 1)c^2 y^2}} + A4y^4 + A6y^6 + A8y^8 + A10y^{10} \quad (8)$$

where, c=1/r, and $$\frac{1}{Rz} = \frac{1}{Rzo} + B1y + B2y^2 + B3y^3 + B4y^4.$$

In the above equations, y represent an image height in the y-axis (i.e., the main scanning) direction, r denotes a radius of curvature, in the main scanning direction, on the optical axis. Curvature in the z-axis direction, at the height y in the main scanning direction, is represented by 1/Rz, and Rzo represents a radius of curvature, in the auxiliary scanning direction, on the optical axis (i.e., y=0). B1, B2, B3 and B4 represent coefficients representing change of the radius of curvature in the auxiliary scanning direction.

Surface #5 is a surface on which the diffraction lens structure is formed, surface #6 is a planar (flat) surface, and surface #7 is a toric surface having an axis, which extends in the auxiliary scanning direction, of symmetry. That is, surface #7 is rotationally symmetrical about the axis. Such a toric surface will be referred to as a Z toric surface hereinafter. Conical coefficients and aspherical coefficients are indicated in TABLE II, while, a numerical structure of surface #5 (i.e., the diffraction lens structure) is indicated in TABLE III.

TABLE II

| Aspherical coefficients for surface #4 | | | |
|---|---|---|---|
| κ | 0.0 | | |
| A4 | −1.782 × 10$^{-6}$ | B1 | −4.081 × 10$^{-5}$ |
| A6 | 8.076 × 10$^{-10}$ | B2 | −1.757 × 10$^{-5}$ |
| A8 | −1.134 × 10$^{-13}$ | B3 | 0.0 |
| A10 | 0.0 | B4 | 3.005 × 10$^{-9}$ |

TABLE III

| fd at design wavelength: 3443.6 mm | |
|---|---|
| Macroscopic shape | |
| r | −491.66 |
| κ | 0.0 |
| A4 | −1.282 × 10$^{-6}$ |
| A6 | 5.012 × 10$^{-10}$ |
| A8 | −5.585 × 10$^{-14}$ |
| A10 | 0.0 |
| Coefficients for additional path length Δφ(h) | |
| P2 | −1.8615 × 10$^{-1}$ |
| P4 | −1.0817 × 10$^{-5}$ |
| P6 | 1.5024 × 10$^{-9}$ |
| P8 | −3.1306 × 10$^{-12}$ |
| P10 | 4.0862 × 10$^{-16}$ |
| D | 1.34 × 10$^{-5}$ |

Figure 3:
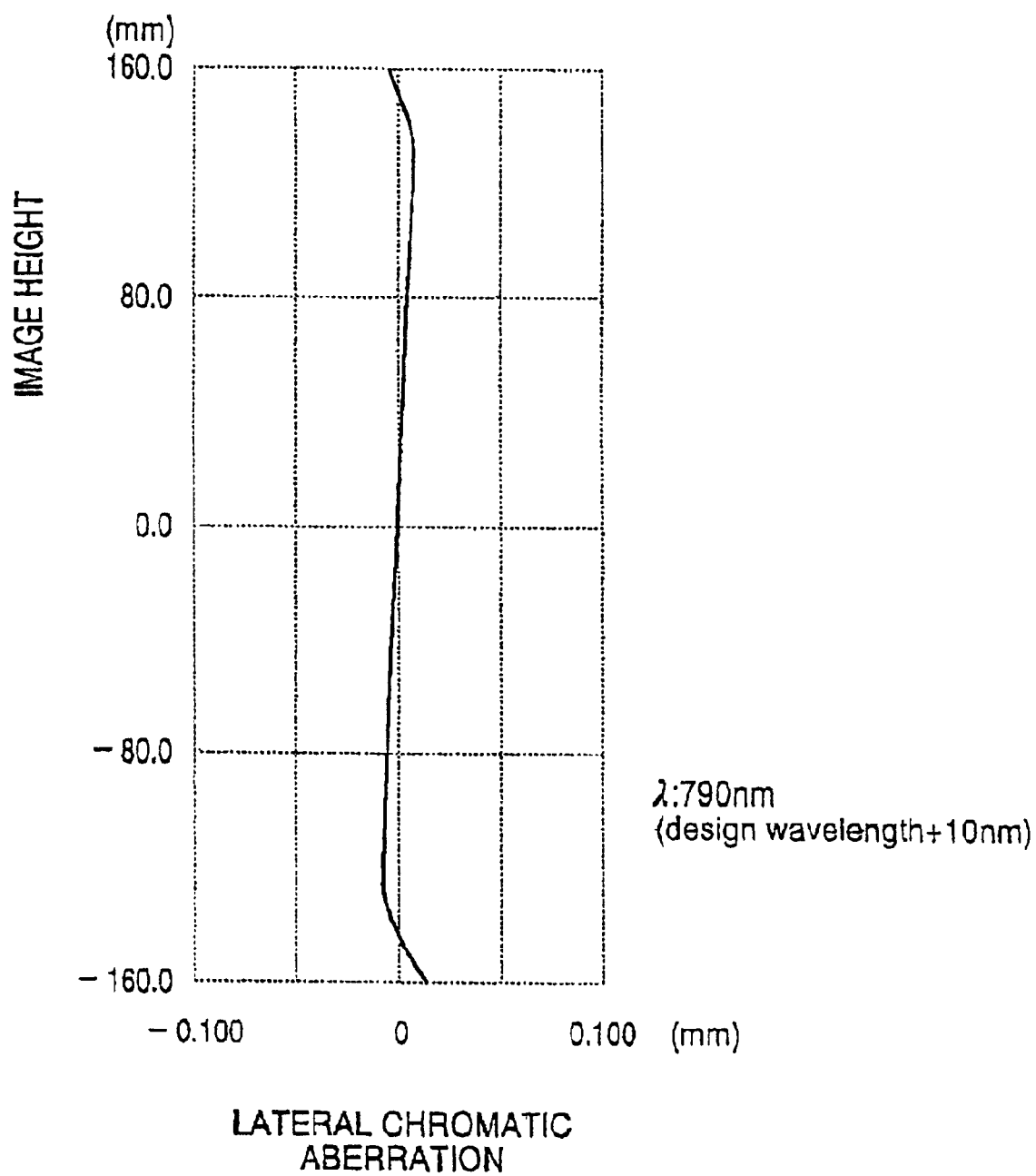
FIG. 3 is a graph showing lateral chromatic aberration of the scanning optical system shown in FIG. 2.

FIG. 3 is a graph showing the lateral chromatic aberration of the scanning optical system according to the first embodiment.

Second Embodiment

Figure 4:
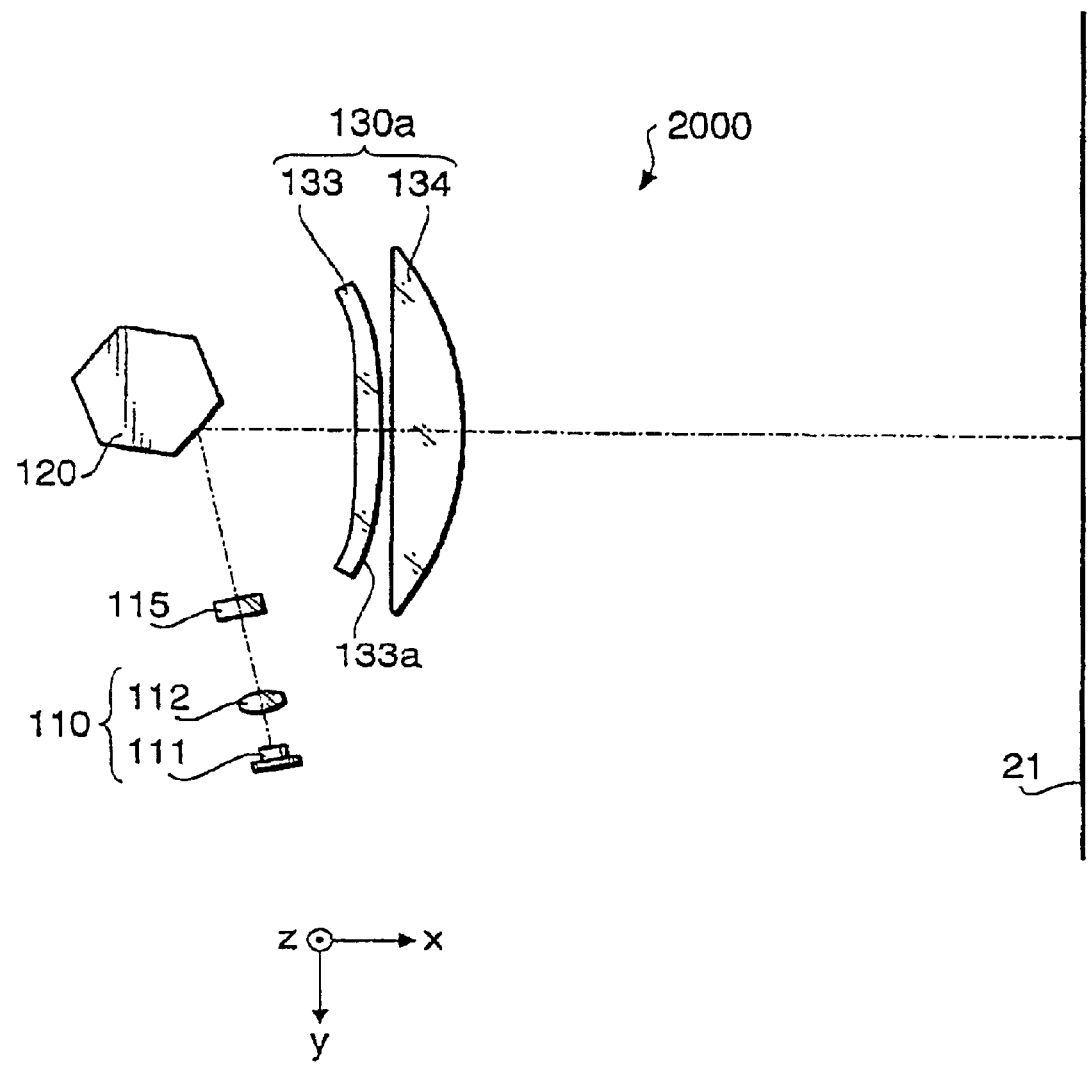
FIG. 4 is a plan view of the scanning optical system according to a second embodiment.

FIG. 4 is a plan view of the scanning optical system 2000, showing an arrangement of optical elements, according to a second embodiment of the invention. The scanning optical system 2000 include an fθ lens 130a, which includes a first lens 133, a second lens 134, and a diffraction lens structure 133a formed on a surface of the first lens 133. The first lens 133 is a plastic lens, and the second lens 134 is a glass lens. In TABLE IV, a numerical structure of the optical elements, on the photoconductive drum side thereof with respect to the cylindrical lens is indicated. In TABLE IV, fa denotes a focal length of the fθ lens 130a in the main scanning direction, ry denotes a radius of curvature in the main scanning direction; rz denotes a radius of curvature in the auxiliary scanning direction (which is omitted for a rotationally symmetrical surface), d denotes a distance between adjacent surfaces on the optical axis, and n denotes a refractive index at a wavelength of 780 nm.

TABLE IV

| | fa = 200.0 mm | scan width: 320 mm | design λ: 780 nm | |
|---|---|---|---|---|
| No. | ry | rz | d | n |
| #1 | inf. | −50.0 | 4.00 | 1.51072 |
| #2 | inf. | — | 94.50 | |
| #3 | inf. | — | 67.00 | |
| #4 | 568.65 | −23.70 | 7.40 | 1.48617 |
| #5 | 7235.14 | — | 4.00 | |
| #6 | inf. | — | 21.50 | 1.51072 |
| #7 | −123.77 | −19.40 | 195.65 | |

Surface #4 is a progressive toric aspherical surface, surface #5 is a surface on which the diffraction lens structure is formed, surface #6 is a planar surface, and surface #7 is a Z toric surface. Conical coefficients and aspherical coefficients for surface #4 are indicated in TABLE V, and the numerical structure of the diffraction lens structure on surface #5 is indicated in TABLE VI.

TABLE V

| fd at the design wavelength: 5677.4 mm | |
|---|---|
| Macroscopic shape | |
| r | 7235.14 |
| κ | 0.0 |
| A4 | $-1.670 \times 10^{-6}$ |
| A6 | $2.655 \times 10^{-10}$ |
| A8 | $-1.900 \times 10^{-14}$ |
| A10 | 0.0 |
| Coefficients for additional path length $\Delta\phi(h)$ | |
| P2 | $-1.1291 \times 10^{-1}$ |
| P4 | $6.0796 \times 10^{-7}$ |
| P6 | $-3.0940 \times 10^{-9}$ |
| P8 | $2.3439 \times 10^{-13}$ |
| P10 | $-7.7883 \times 10^{-17}$ |
| D | $8.17 \times 10^{-6}$ |

Figure 5:
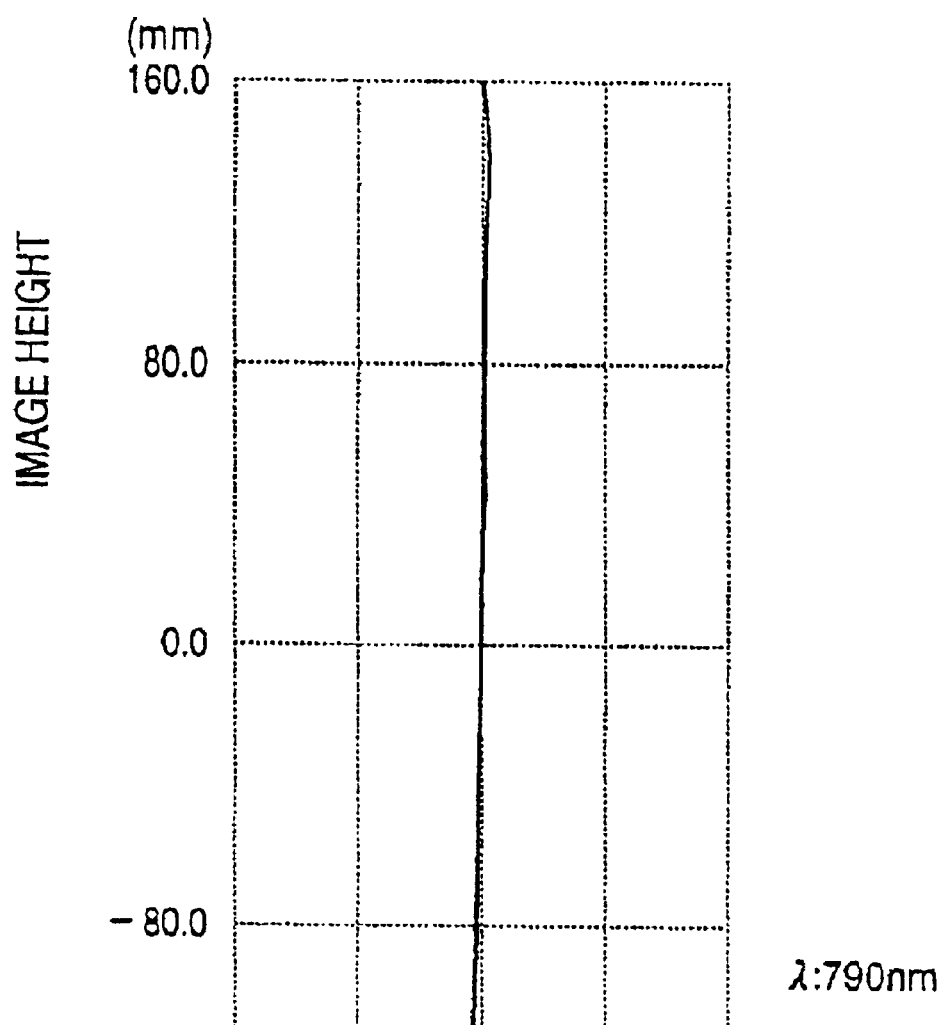
FIG. 5 is a graph showing lateral chromatic aberration of the scanning optical system shown in FIG. 4.

FIG. 5 is a graph showing the lateral chromatic aberration of the scanning optical system according to the second embodiment.

Third Embodiment

Figure 6:
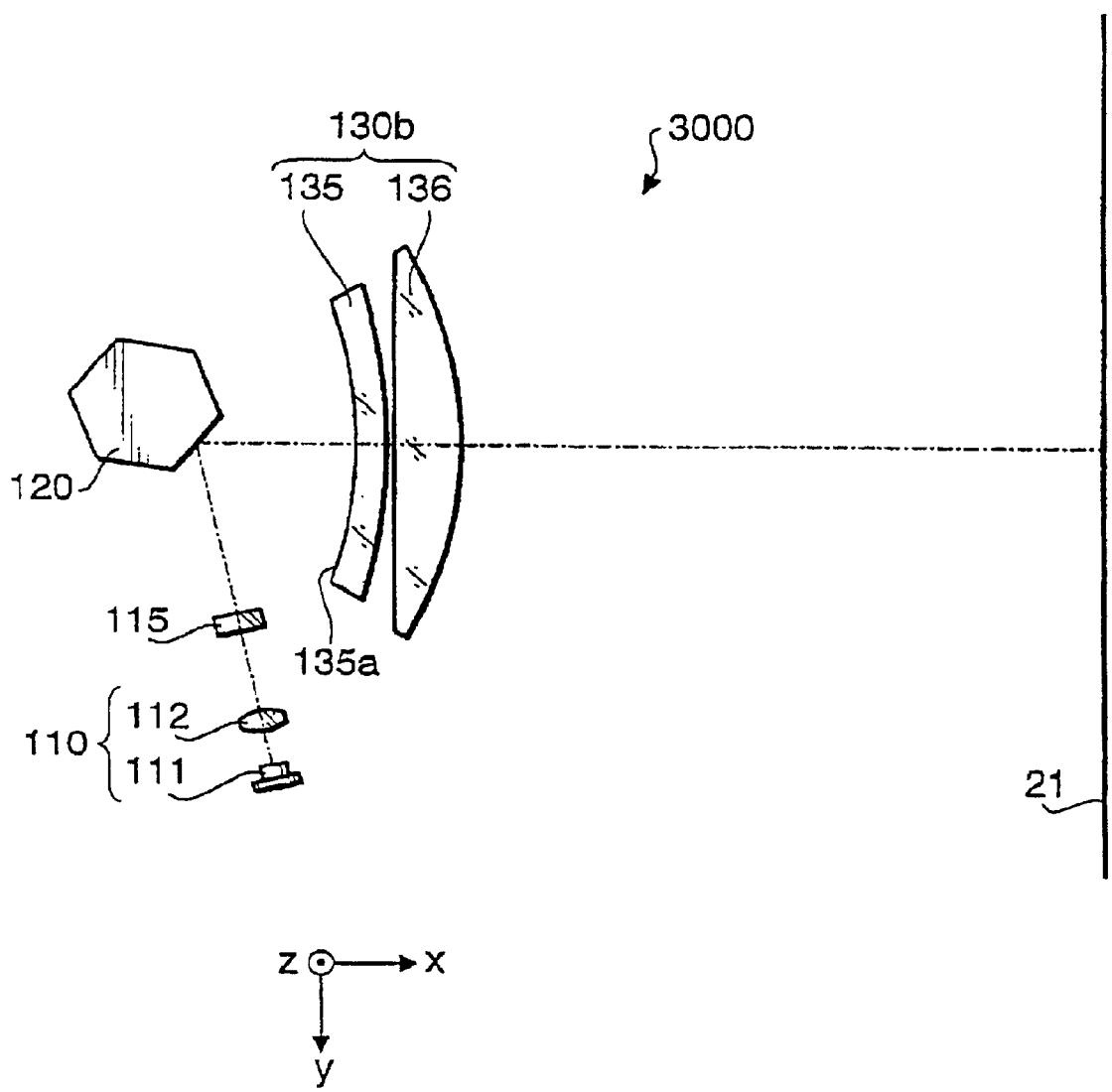
FIG. 6 is a plan view of the scanning optical system according to a third embodiment.

FIG. 6 is a plan view of the scanning optical system 3000, showing an arrangement of optical elements, according to a third embodiment of the invention. The scanning optical system 3000 include an fθ lens 130b, which includes a first lens 135, a second lens 136, and a diffraction lens structure 135a formed on a surface of the first lens 135. The first lens 135 is a plastic lens, and the second lens 136 is a glass lens. In TABLE VII, a numerical structure of the optical elements, on the photoconductive drum side thereof with respect to the cylindrical lens is indicated. In TABLE VII, fa denotes a focal length of the fθ lens 130b in the main scanning direction, ry denotes a radius of curvature in the main scanning direction, rz denotes a radius of curvature in the auxiliary scanning direction (which is omitted for a rotationally symmetrical surface), d denotes a distance between adjacent surfaces on the optical axis, and n denotes a refractive index at wavelength of 780 nm.

TABLE VII

| fa = 199.7 mm | scan width: 320 mm | design λ: 780 nm | | |
|---|---|---|---|---|
| No. | ry | rz | d | n |
| #1 | inf. | −50.0 | 4.00 | 1.51072 |
| #2 | inf. | — | 94.50 | |
| #3 | inf. | — | 68.00 | |
| #4 | −207.48 | — | 8.70 | 1.48617 |
| #5 | −264.05 | −56.42 | 3.00 | |
| #6 | inf. | — | 20.00 | 1.76591 |
| #7 | −149.04 | −51.23 | 202.73 | |

Surface #4 is a surface on which the diffraction lens structure is formed, surface #5 is a progressive toric aspherical surface, surface #6 is a planar surface, and surface #7 is a Z toric surface. The numerical structure of the diffraction lens structure on surface #4 is indicated in TABLE VIII, and the conical coefficients and aspherical coefficients for surface #5 are indicated in TABLE IX.

TABLE VIII

| fd at design wavelength: 3700.3 mm | |
|---|---|
| Macroscopic shape | |
| r | −207.48 |
| κ | 0.0 |
| A4 | $-1.472 \times 10^{-6}$ |
| A6 | $6.166 \times 10^{-10}$ |
| A8 | $-7.251 \times 10^{-14}$ |
| A10 | 0.0 |
| Coefficients for additional path length $\Delta\phi(h)$ | |
| P2 | $-1.7324 \times 10^{-1}$ |
| P4 | $-1.1333 \times 10^{-4}$ |
| P6 | $3.8473 \times 10^{-8}$ |
| P8 | $-9.3384 \times 10^{-12}$ |
| P10 | $1.1066 \times 10^{-15}$ |
| D | $2.59 \times 10^{-5}$ |

TABLE IX

| Conical and aspherical coefficients for surface #5 | | | |
|---|---|---|---|
| κ | 0.0 | | |
| A4 | $-8.901 \times 10^{-7}$ | B1 | $2.157 \times 10^{-5}$ |
| A6 | $3.352 \times 10^{-10}$ | B2 | $2.310 \times 10^{-6}$ |
| A8 | $-3.235 \times 10^{-14}$ | B3 | 0.0 |
| A10 | 0.0 | B4 | $5.929 \times 10^{-10}$ |

Figure 7:
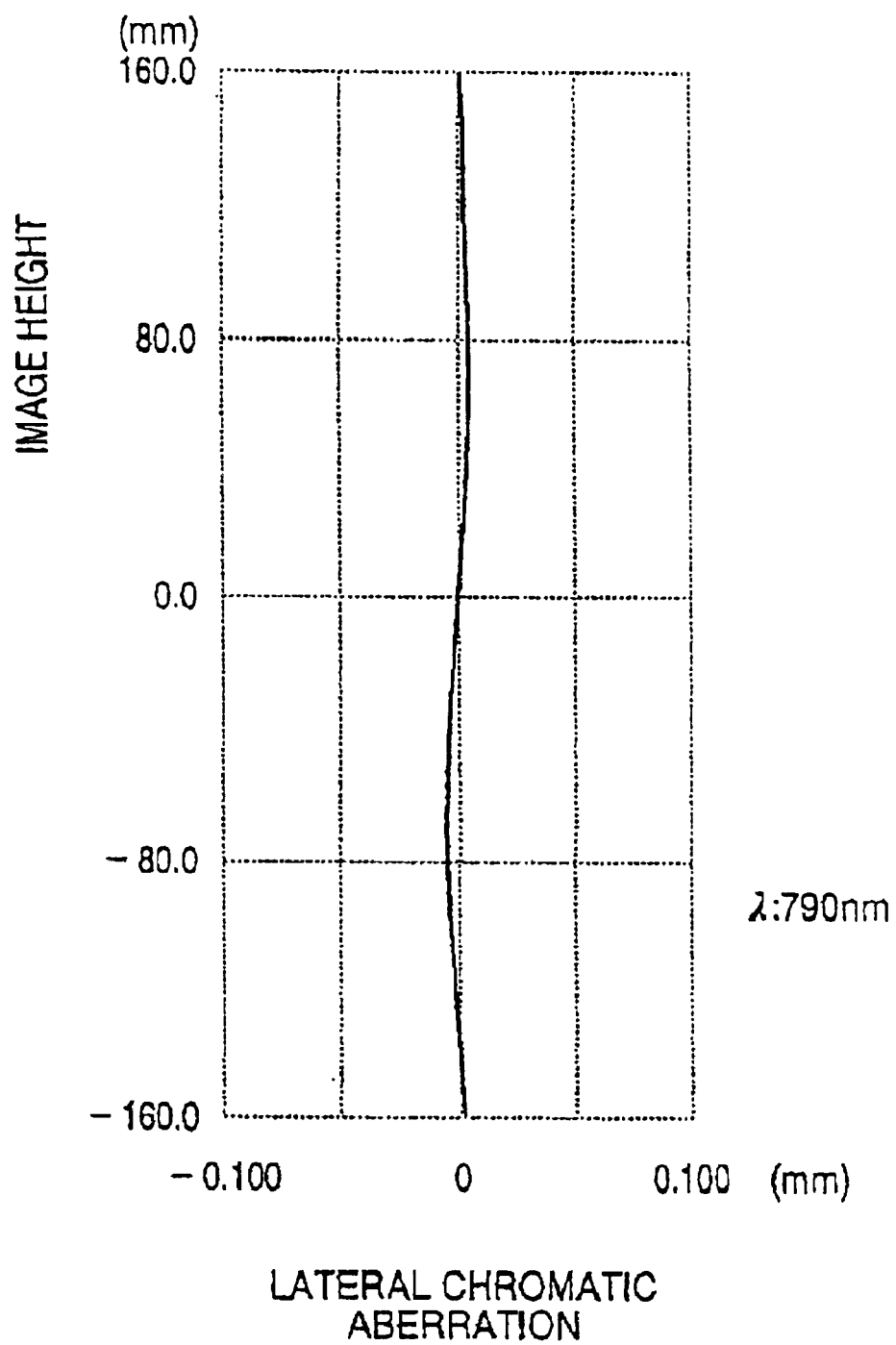
FIG. 7 is a graph showing lateral chromatic aberration of the scanning optical system shown in FIG. 6.

FIG. 7 is a graph showing the lateral chromatic aberration of the scanning optical system according to the third embodiment.

TABLE X indicates values fa/fd and fa/fg of each embodiment.

TABLE X

| condition | 1st emb. | 2nd emb. | 3rd emb. |
|---|---|---|---|
| 0.0 < fa/fd < 0.20 | 0.06 | 0.04 | 0.05 |
| 0.75 < fa/fg < 1.20 | 0.99 | 0.83 | 1.03 |

As is known from TABLE X, in each embodiment, conditions (1) and (2) are satisfied. Therefore, in each embodiment, the lateral chromatic aberration and variation of power due to a change of refractive index can be suppressed. Therefore, with a printer employing the scanning optical system according to the present invention, color drift of printed images due to variations of wavelengths of the laser beams for respective color components, and due to uneven distribution of temperature inside the printer can be suppressed, and color images can be printed accurately.

The present disclosure relates to the subject matter contained in Japanese Patent Application No. HEI 11-248465, filed on Sep. 2, 1999, which is expressly incorporated herein by reference in its entirety.

What is claimed is:
1. A tandem type printer, comprising:
a plurality of scanning optical systems, each of which includes a laser source that emits a laser beam, and a deflector that deflects the laser beam to scan, in a main scanning direction, within a predetermined angular range, said plurality of scanning optical system respectively including a plurality of fθ lenses that converge the laser beams emitted by said plurality of scanning optical systems; and
a plurality of photoconductive drums arranged to receive the laser beams emitted from said plurality of fθ lenses, respectively, the laser beams scanning on said plurality of photoconductive drums, respectively, images formed on said plurality of photoconductive drums being developed and transferred in an overlaid fashion on a sheet, wherein each of said plurality of fθ lenses includes:

a glass lens that provides substantially all the power, in the main scanning direction, of said each of said plurality of fθ lenses;

a plastic lens that compensates for aberrations; and a diffraction lens structure that compensates for a lateral chromatic aberration in the main scanning direction, and wherein each fθ lens satisfies conditions:

$$0.0 < fa/fd < 0.20; \text{ and}$$

$$0.75 < fa/fg < 1.20,$$

where, fa represents a focal length of the fθ lens in the main scanning direction;

fd represents a focal length of said diffraction lens structure in the main scanning direction; and fg represents a focal length of said glass lens in the main scanning direction.

2. The tandem type printer according to claim 1, wherein said diffraction lens structure is formed on a refraction surface of said plastic lens in each fθ lens.

3. An fθ lenses for a laser beam printer, comprising:

a glass lens that provides substantially all the power, in a main scanning direction, of said fθ lens;

a plastic lens that compensates for aberrations; and a diffraction lens structure that compensates for a lateral chromatic aberration in the main scanning direction, wherein each fθ lens satisfies conditions:

$$0.0 < fa/fd < 0.20; \text{ and}$$

$$0.75 < fa/fg < 1.20,$$

where, fa represents a focal length of the fθ lens in the main scanning direction;

fd represents a focal length of said diffraction lens structure in the main scanning direction; and fg represents a focal length of said glass lens in the main scanning direction.

4. The fθ lens according to claim 3, wherein said diffraction lens structure is formed on a refraction surface of said plastic lens.

* * * * *